(12) United States Patent
Stec (10) Patent No.: US 6,737,188 B2
(45) Date of Patent: May 18, 2004

(54) SEAL FOR AN ELECTROCHEMICAL CELL (75) Inventor: William Michael Stec, Brook Park, OH (US)

(73) Assignee: Eveready Battery Company, Inc., St. Louis, MO (US)

( * ) Notice: Subject to any disclaimer, the term of this patent is extended or adjusted under 35 U.S.C. 154(b) by 101 days.

(21) Appl. No.: 10/079,678

(22) Filed: Feb. 20, 2002

(65) Prior Publication Data

US 2003/0157398 A1 Aug. 21, 2003

(51) Int. Cl.[7] .......................... H01M 2/12; G01F 11/10
(52) U.S. Cl. .................. 429/82; 429/53; 202/203.11; 202/203.29; 222/358
(58) Field of Search ........................ 429/82, 174, 53; 220/203.11, 203.28, 203.29; 222/396

(56) References Cited

U.S. PATENT DOCUMENTS 5,173,379 A * 12/1992 Ichinose et al. ............ 429/174
6,270,919 B1 * 8/2001 Janmey ....................... 429/56
6,312,850 B1 * 11/2001 Janmey ...................... 429/174

FOREIGN PATENT DOCUMENTS

EP    0 966 052 A1    12/1999
EP    1 137 079 A2    9/2001

* cited by examiner

Primary Examiner—Patrick Ryan
Assistant Examiner—Thomas H. Parsons
(74) Attorney, Agent, or Firm—Stewart A. Fraser (57) ABSTRACT A ventable seal is provided for closing the open end of an electrochemical cell. The seal incorporates indentations formed in the outer surface of the centrally located hub that abuts a flexible diaphragm at a ventable interface. If a cell's internal pressure reaches an unsafe level and the seal ruptures, the indentations prevent resealing of the ruptured seal thereby avoiding a second build up of pressure within the cell.

30 Claims, 5 Drawing Sheets

SEAL FOR AN ELECTROCHEMICAL CELL

BACKGROUND OF THE INVENTION

This invention generally relates to ventable seals for pressurized containers and, more particularly, to ventable seals for electrochemical cells.

Electrochemical cells, such as cylindrical alkaline electrochemical cells, employ two electrochemically active materials and an aqueous electrolyte. The electrochemically active materials are typically manganese dioxide and zinc. These materials are conventionally housed in a cylindrical elongated container that is open on one end so that the electrochemically active materials and electrolyte can be inserted therein during the cell manufacturing process. A closure assembly that incorporates a disc shaped elastomeric seal body and an elongated metallic current collector that projects through the center of the seal body closes the open end of the container. The seal body usually includes a hub, which surrounds the collector, and a thin diaphragm integrally molded into the central region of the seal body. The function of the diaphragm is to rupture and release gas from within the cell when the internal pressure becomes too high. The collector provides a conductive path between the zinc and one of the cell's terminal covers which is located on the end of the cell.

Manufacturers of electrochemical batteries constantly strive to improve the performance of their products in a wide variety of battery powered devices. While most batteries are used in a conventional manner, a small percentage of batteries are exposed to extreme or abuse conditions. One of the abuse conditions occurs when a battery experiences a direct electrical short. This condition occurs when a low resistance electrical path is established between the anode and cathode. In one scenario, a direct electrical short can occur when a contact spring in a device, such as a flashlight containing two D-size batteries, inadvertently bridges the gap between the edge of the battery's steel container which contacts the cathode and the negative terminal cover that electrically contacts the anode. The spring is made of a highly conductive material such as nickel plated steel and thus provides a low resistance electrical connection between the anode and cathode. As soon as the direct electrical short is established, the cell begins to discharge as quickly as possible. In D-size batteries, which measure approximately 61 mm high and 34 mm in diameter, currents in excess of 20 amps are possible. Due to the exothermic chemical reactions that take place within a cell during the rapid discharge, the entire battery may reach temperatures in excess of 70° C. The increase in temperature increases the pressure within the cell. In addition to increasing the temperature of the battery, the chemical reactions that take place during discharge rapidly generate quantities of hydrogen gas that substantially increase pressure within the cell. The simultaneous production of hydrogen gas and increase in temperature causes the elastomeric seal, which is typically made of nylon, to become soft and lose some of its structural rigidity. The thin ventable portion of the seal may become elongated due to both the heating of the nylon and the increase in internal pressure. Consequently, when the softened and distorted seal ruptures in response to the pressure buildup, an initial quantity of gas may escape from within the cell but the tear in the ruptured seal could be resealed when the softened ruptured seal contacts the smooth outer surface of the seal's hub and reseals against the hub. If the ruptured seal does reseal against the hub and the cell continues to generate gas, the cell may eventually experience a crimp release wherein the crimped connection between the seal and container is broken and the closure assembly is forcefully ejected from the container.

As disclosed in U.S. Pat. No. 6,270,919 B1, previous attempts to prevent resealing of a ruptured seal body have included modifying a seal's inner disc portion to include ribs. The ribs are designed to maintain the opening in a ruptured seal body thereby preventing resealing of the vent mechanism. However, while the inclusion of ribs in the seal's diaphragm is helpful in preventing resealing in most cells, some cells with the ribs incorporated therein may be deformed when exposed to the heat generated during a direct electrical short such that the ribs cannot maintain the opening in the seal after it has ruptured.

In a seal design disclosed in U.S. Pat. No. 6,312,850 B1, vertical grooves were placed in the surface of a compression member that forms a part of the seal assembly. The grooves are designed to prevent resealing of a vented seal's diaphragm. The grooves create channels that allow the gas to vent and thereby prevent resealing of the vented diaphragm. While this embodiment does prevent resealing of a vented seal, the compression member is an extra part that must be manufactured and assembled onto the seal body. This increases the cost of the battery and complicates the cell manufacturing process. Furthermore, the compression member occupies volume within the cell that would be better used to house electrochemically active materials.

Therefore, there exist a need for an inexpensive and simple to manufacture elastomeric seal body that occupies a minimum amount of volume within the cell and can reliably prevent resealing of a vented electrochemical cell.

BRIEF SUMMARY OF THE INVENTION

The present invention provides a ventable seal body that prevents resealing of a ruptured seal in a pressurized container. The disc shaped seal body is manufactured as a single component including a first surface, a second surface, a flexible diaphragm formed between the surfaces and a protrusion that projects from the first surface. The protrusion includes a proximal section and a venting section. The proximal section, which abuts the flexible diaphragm at a ventable interface, includes an outer surface free of one or more indentations. The venting section, which is concentrically aligned with and abuts the proximal section, includes an outer surface with at least one indentation formed therein. The indentation in the venting section creates an unobstructed path along the outer surface of the venting section.

The present invention also provides for an electrochemical cell having a container with an open end, a closed end and a sidewall therebetween. The container includes a separator and two electrochemically active materials arranged on opposite sides of the separator. A disc shaped seal body formed as a single component is secured to the open end of the container. The seal body has a top surface, a bottom surface and a perimeter that contacts the top and bottom surfaces. A flexible diaphragm is formed between the surfaces and positioned around a centrally located protrusion that projects perpendicularly from the center of the seal body's top surface. The protrusion defines an opening between the top and bottom surfaces. The protrusion has a proximal section abutting the flexible diaphragm at a ventable interface and a venting section concentrically aligned with and abutting the proximal section. The proximal section comprises an outer surface that is free of one or more indentations. The venting section has an outer surface with at least one indentation formed therein. The venting section's indentation creates an unobstructed pressure relief path along the outer surface of the venting section. A current collector extends through the opening in the protrusion and contacts an electrochemically active material in the cell. A cover is positioned between the flexible diaphragm and the cell's external environment.

DETAILED DESCRIPTION OF THE INVENTION

Figure 1:
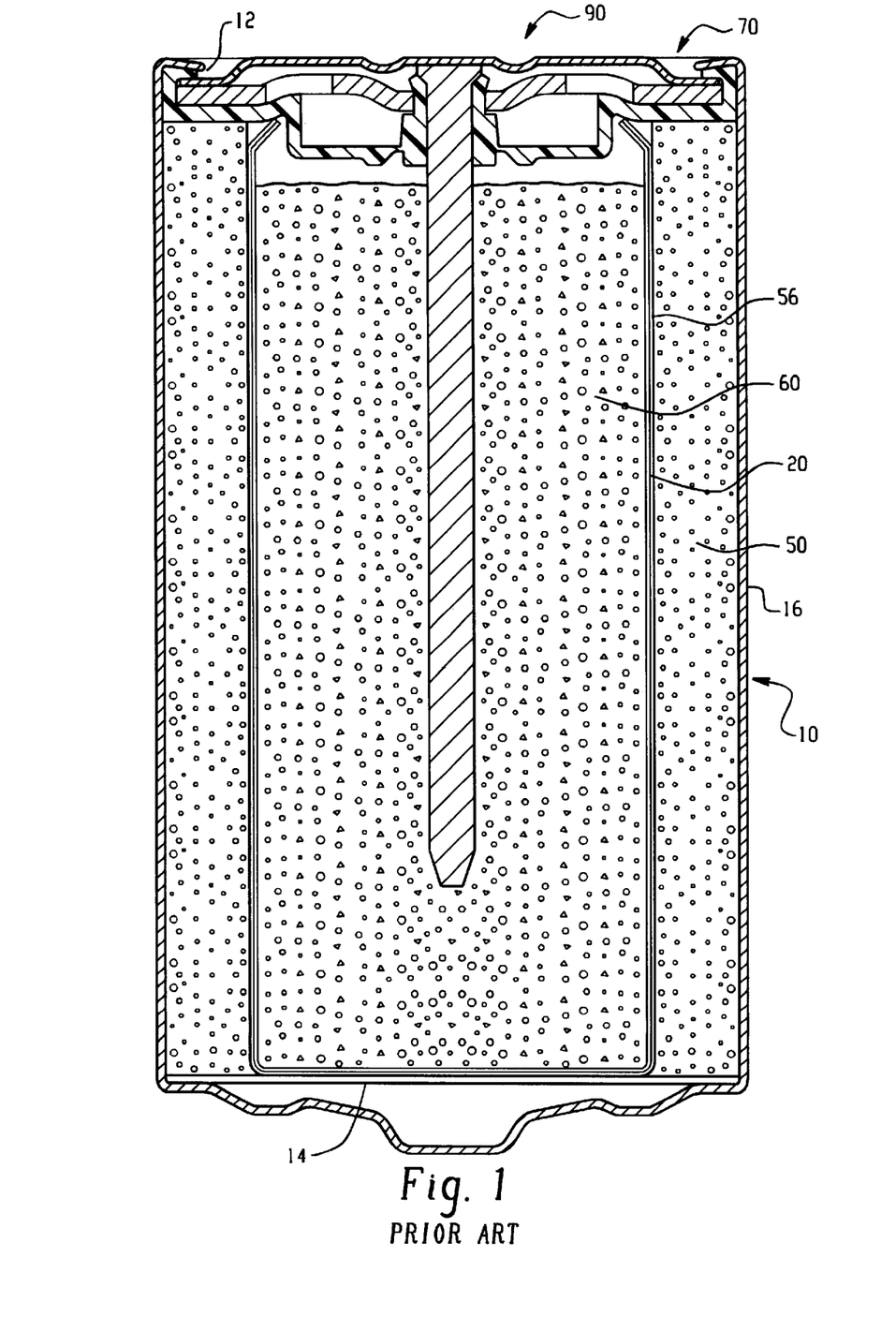
FIG. 1 is a cross section of a conventional cylindrical alkaline electrochemical cell.

Referring now to the drawings and more particularly to FIG. 1, there is shown a cross section of a conventional alkaline electrochemical cell 90. Beginning with the exterior of the cell, the cell components are the container 10, first electrode 50 positioned adjacent the interior surface of container 10, separator 20 contacting the interior surface 56 of first electrode 50, second electrode 60 disposed within the cavity defined by separator 20 and closure assembly 70 secured to container 10. Container 10 has an open end 12, a closed end 14 and a sidewall 16 therebetween. The closed end 14, sidewall 16 and closure assembly 70 define a cavity in which the cell's electrodes are housed.

Figure 2:
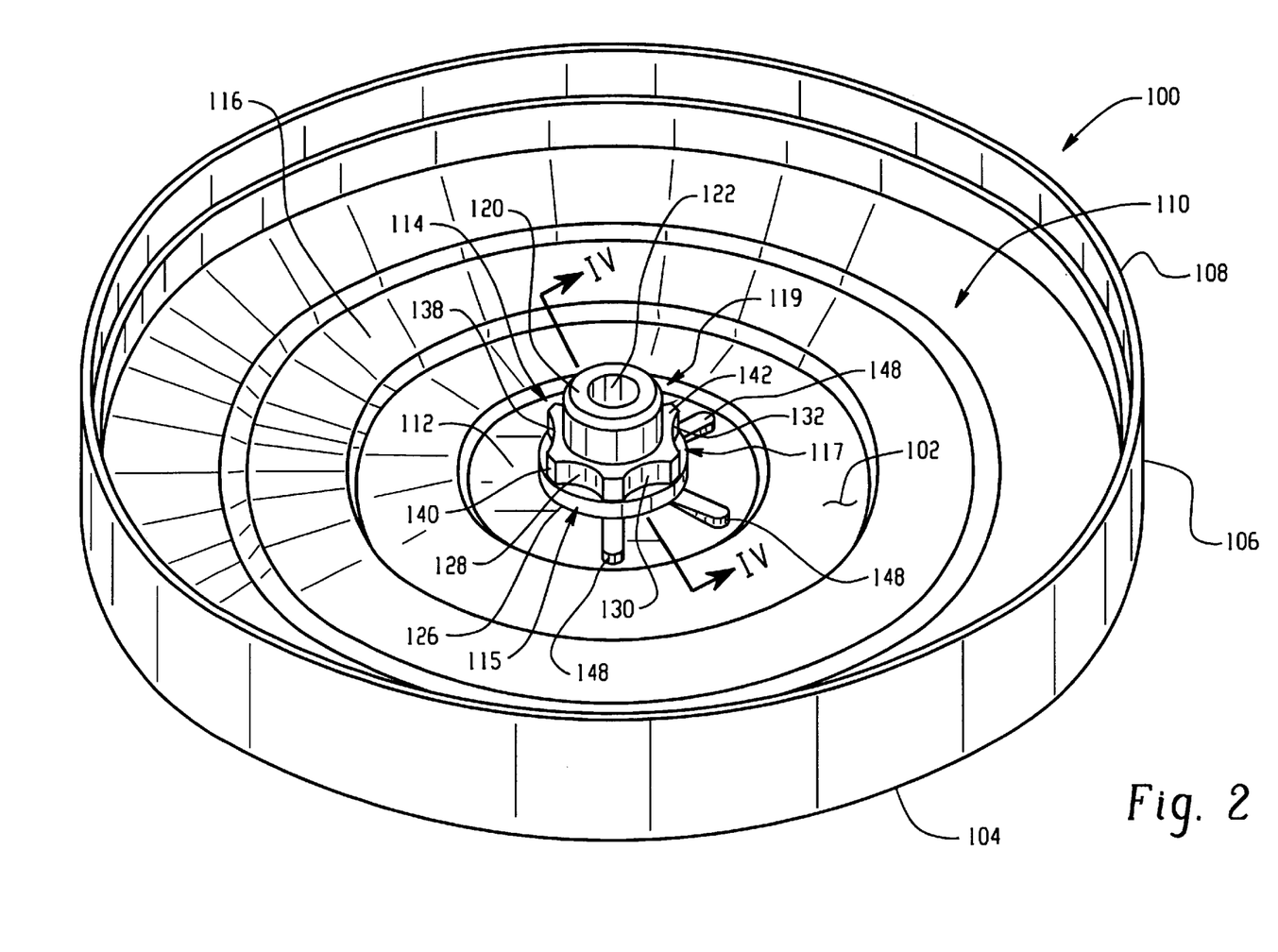
FIG. 2 is a perspective view of a seal of the present invention.

A seal body of this invention is shown in FIG. 2. The seal body may be manufactured by injection molding an electrically nonconductive material such as nylon, polystyrene, polypropylene or other plastic material. The mold is designed to provide the seal body with the desired features, such as a rupturable vent and a centrally located opening for accommodating a current collector, which make the seal body suitable for use in electrochemical cells. As shown in FIG. 2, seal body 100 is a generally disc shaped component with a first surface 102, a second surface 104 and an edge 106 that defines the perimeter of the seal. First surface 102 may be referred to herein as the top surface. Second surface 104 may be referred to herein as the bottom surface. The edge 106 includes an upstanding wall 108. Inwardly disposed from the wall is central region 110 of seal body 100. The central region comprises a flexible diaphragm 112 that abuts ventable interface 126. The ventable interface contacts protrusion 114 that projects perpendicularly from the center of the seal body's top surface. The protrusion is also known herein as a hub. Located between wall 108 and flexible diaphragm 112 is a nonventing portion 116 of central region 110. The nonventing portion is thicker than flexible diaphragm 112 that surrounds hub 114.

Protrusion 114 in FIG. 2 can be generally described as comprising three distinct sections even though all sections of the hub, like the seal itself, are formed as a single component when the seal is manufactured. The portion of hub 114 that abuts ventable interface 126 is known herein as proximal section 115. The outside diameter of the proximal section is constant throughout the height of the proximal section. The top of the proximal section appears to abut the hub's venting section 117. The maximum outside diameter of venting section 117 is equal to or slightly smaller than the outside diameter of proximal section 115. Venting section 117 includes one or more indentations 128, 130, 132 and 138 that function as pressure relief indentations for the seal body. In a preferred embodiment, the indentations are arcuate shaped. The ratio of the width of the indentation to the depth of indentation should be greater than 1:1 and less than 6:1. Preferably, the ratio of width to depth is greater than 2:1 and less than 4:1. More preferably, the ratio is about 3:1. If desired, the indentations could be shaped as rectangles, semicircles or ovals. In between the indentations are outwardly bowed extensions 140 of venting section 117. Extensions 140 separate the indentations from one another. The top of the venting section forms a first shoulder 142 that abuts the bottom of the hub's third section that is known herein as the distal section 119. The outside diameter of distal section 119 is less than the outside diameter of venting section 117 which is equal to or less than the outside diameter of proximal section 115. The outer surface of distal section 119 is free of the indentations that characterize venting section 117. The end of distal section 119 forms a second shoulder 120 at the end of hub 114. The interior surfaces of distal section 119, venting section 117 and proximal section 115 define an opening 122 through seal body 100.

The functionality of the protrusion's proximal, venting and distal sections will now be explained. Proximal section 115 forms ventable interface 126 with flexible diaphragm 112. The interface is designed to rupture when the cell's internal pressure reaches a predetermined value. Preferably, ventable interface 126 will tear quickly when the seal body vents. In order to get predictable and rapid venting, proximal section 115 and flexible diaphragm 112 form an arc shaped ventable interface 126 having a uniform thickness around the proximal section. The arc is achieved by having a washer shaped proximal section abutting a thin ventable interface. Preferably, the arc is at least 180°, more preferably 270° and most preferably a circle. The height of the proximal section must be selected to insure that the one or more indentations in the venting section do not interfere with the tearing at interface 126.

The venting section's key function is to provide one or more indentations which serve as pressure relief paths for the entrapped gas as it is released from within the cell. While the length, width and height of the indentation can be altered to accommodate factors such as moldability of the seal body, indentations with a width to depth ratio of approximately 3:1 are preferred. An arcuate shaped indentation is particularly preferred because the arc is easy to incorporate into the mold used to form the seal body. Furthermore, an arcuate shaped indentation facilitates uniform manufacturing of the seal body. The height of the indentation must be sufficient to allow the gas to escape to the cell's environment.

Figure 5:
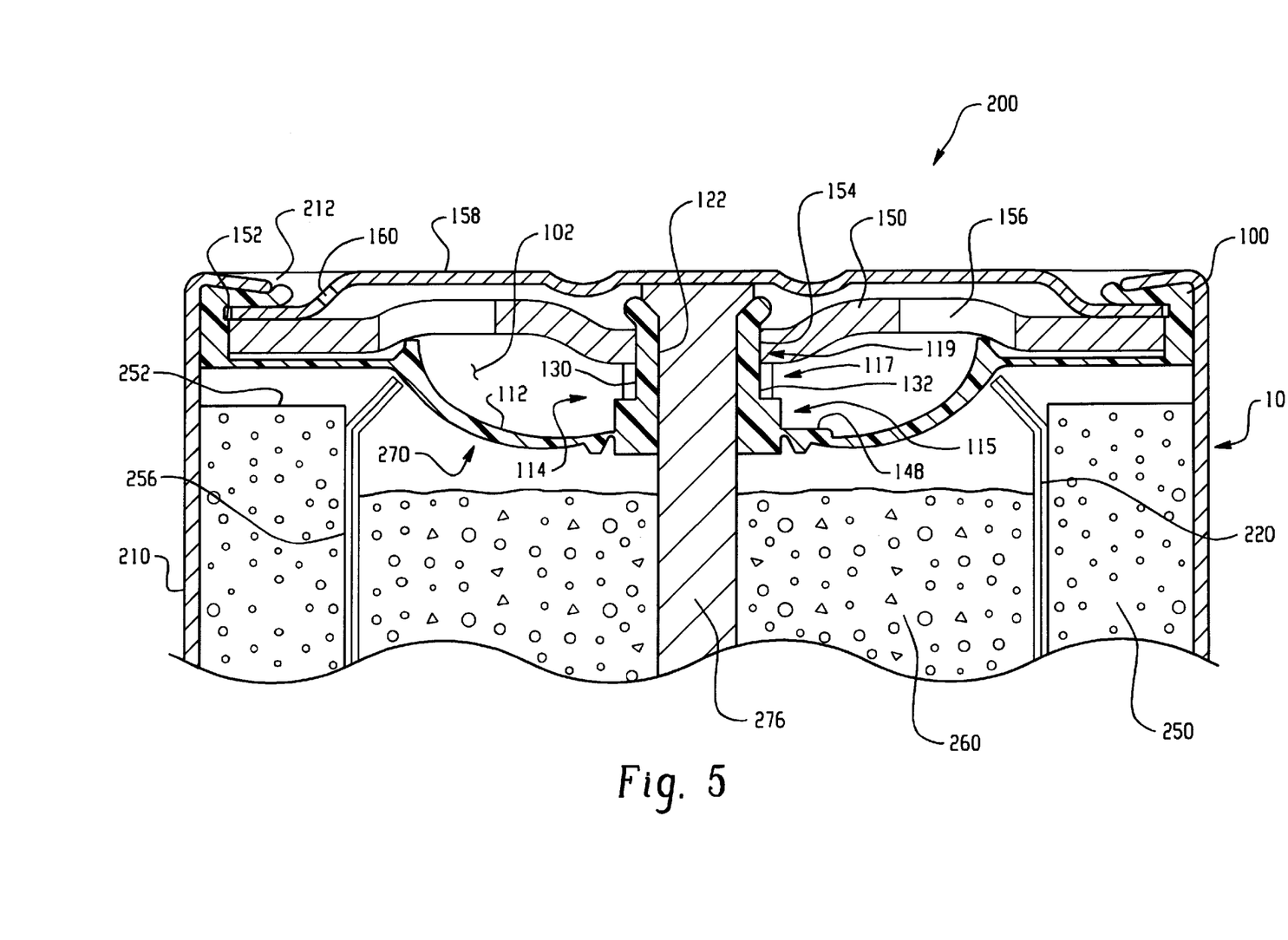
FIG. 5 is a partial cross section of an electrochemical cell of the present invention.

The principle function of distal section 119 is to provide a leakproof interface between current collector 276 and inner cover 150 (see FIG. 5). The interface between the collector and the inner cover must be able to stop electrolyte from leaving the cell by creeping along the surface of the collector. This is accomplished by using a collector with an outside diameter larger than the inside diameter of opening 122 in seal body 100 so that an interference fit is established between the collector and seal body. In order to achieve uniform compression of the distal section between the collector and cover the thickness of the distal section between these two parts must be consistent. Consequently, the one or more indentations that characterize the venting section must terminate below the distal section so that the indentation does not interfere with the compression of the seal body in distal section 119 of protrusion 114.

As shown in FIG. 2, one or more ribs 148 may be incorporated into the top surface of flexible diaphragm 112. One end of each rib 148 abuts the outer surface of proximal section 115. Each rib is integrally formed in top surface 102 of seal body 100 and is located along a line radiating from the center of seal body 100 toward the perimeter of the seal body. An end of each rib 148 that abuts the proximal section of the hub is approximately located between the indentations in venting section 117 of hub 114. Ribs 148 are intended to prevent flexible diaphragm 112 from resealing against the interior surface of inner cover 150. Since the ribs prevent a portion of the torn flexible diaphragm from moving upward and blocking the escape route of the gas that is trapped within the cell, the ruptured seal body does not reseal and allow the cell to become pressurized once again.

Figure 3:
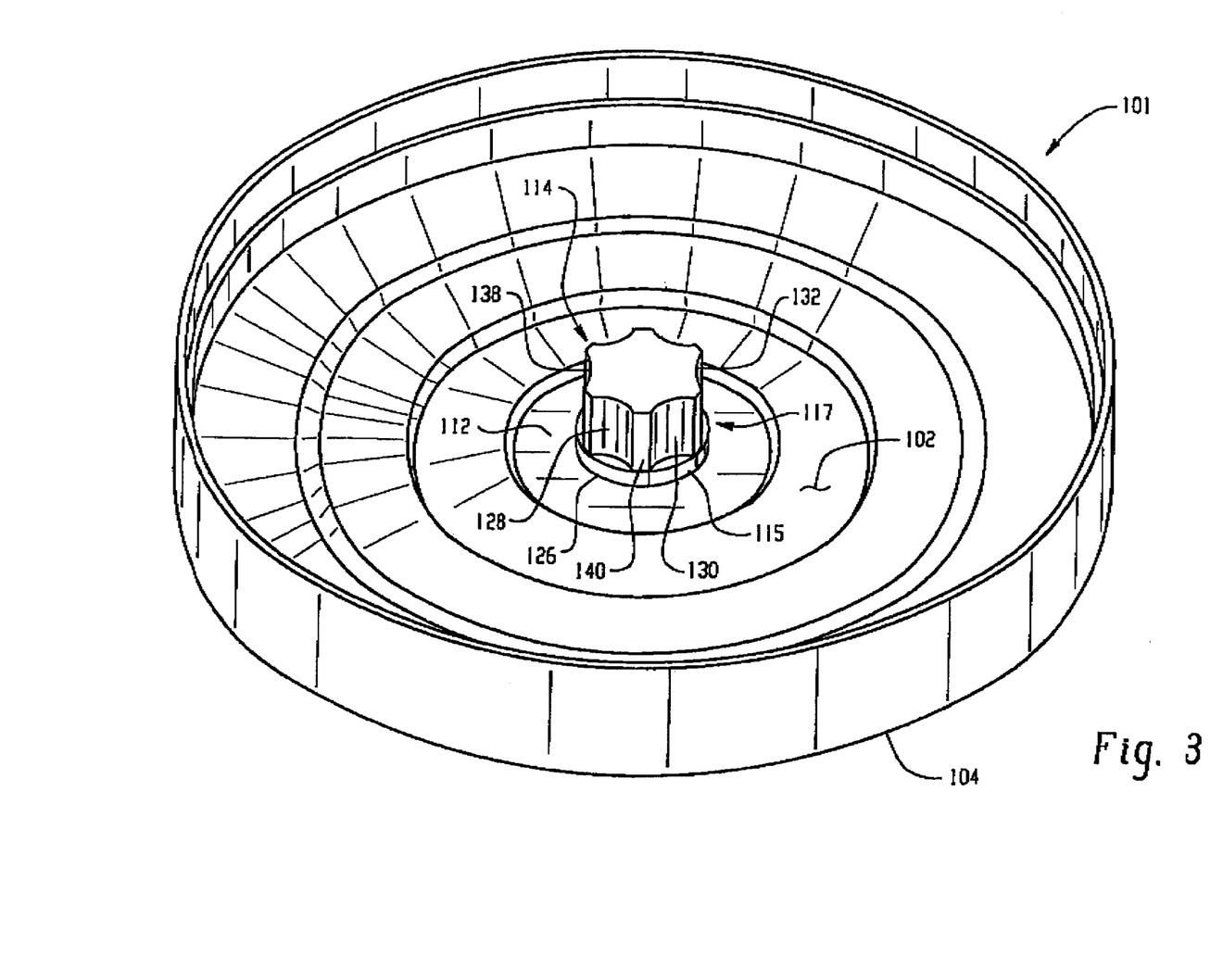
FIG. 3 is a perspective view of another seal of the present invention.

Shown in FIG. 3 is another embodiment of the present invention. Seal body 101 is disc shaped and formed as a single component having a first surface 102, a second surface 104 and a perimeter 106. Flexible diaphragm 112 is formed between the first surface and the second surface. Protrusion 114 projects from first surface 102 and abuts flexible diaphragm 112 at ventable interface 126. Protrusion 114 comprises proximal section 115 and venting section 117. The surface of proximal section 115 is free of any grooves, indentations or channels. In contrast, the surface of venting section 117 comprises at least one indentation. As shown in FIG. 3, the hub may have several indentations 128, 130, 132 and 138. The number of indentations may be varied to accommodate differences in the seal's physical parameters such as: outer diameter of the seal's hub; elasticity of the seal material at elevated temperature; and pressure at which the seal is designed to vent. Preferably the hub has two, four or six indentations. Between any two adjacent indentations is an outwardly bowed portion 140. The outwardly bowed portion separates the individual indentations, also referred to herein as relief paths, from one another.

Figure 4:
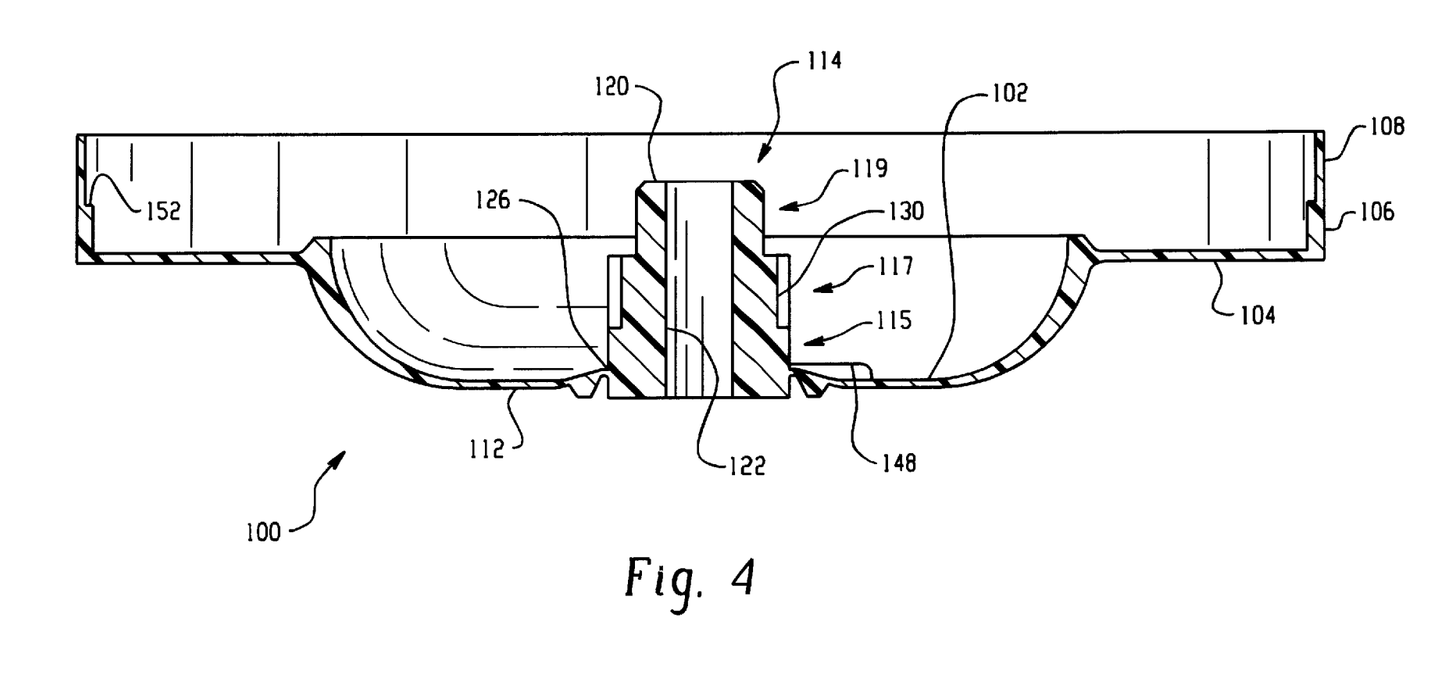
FIG. 4 is a cross section of the seal shown in FIG. 2.

FIG. 4 shows a cross section of the seal of FIG. 2. Protrusion 114 comprises proximal section 115, venting section 117 and distal section 119. Proximal section 115 abuts flexible diaphragm 112 at ventable interface 126. The surface of proximal section 115 is free of any grooves or indentations. Venting section 117 comprises indentation 130 and outwardly bowed portions 140 (not shown). Distal section 119, which is concentrically aligned with proximal section 115 and venting section 117, adjoins venting section 117. The free end of protrusion 114 terminates at shoulder 120. Opening 122, located in the center of the seal body, defines a passage between top surface 102 and bottom surface 104. Perimeter 106 is defined by wall 108. Ledge 152 abuts wall 108. Rib 148 extends from the surface of flexible diaphragm 112.

Shown in FIG. 5 is a partial cross sectional view of an electrochemical cell 200 of this invention. The cell includes container 210 having an open end 212. Disposed within the container are first electrode 250, second electrode 260, separator 220 and a quantity of an aqueous alkaline electrolyte. Closure assembly 270 is secured to the open end of the container. The assembly comprises seal body 100 that includes proximal section 115 which adjoins flexible diaphragm 112 at ventable interface 126, venting section 117 that abuts proximal section 115 and includes indentations 130 and 132, and distal section 119 which is concentric with and adjoins venting section 117. The closure assembly also includes a centrally located current collector 276 that protrudes through opening 122 in seal body 100 and inner cover 150. The current collector is an elongated rod made of an electrically conductive material such as brass. One end of the collector contacts second electrode 260 and the opposite end of the collector protrudes through top surface 102 of seal body 100 and contacts one of the cell's terminal covers 158. Inner cover 150 is located above top surface 102 of seal body 100. The perimeter of cover 150 contacts seal ledge 152. The center of cover 150 defines an opening 154. The inside diameter of cover opening 154 is smaller than the outer diameter of the hub's venting section 117 and greater than the outer diameter of the hub's distal section 119. The outside diameter of collector 276, the inside diameter of opening 112 and the thickness of distal section 119 are selected so that after collector 276 has been inserted into opening 122 in seal body 100, a portion of distal section 119 is forced outwardly against cover 150 by collector 276 thereby imparting tangential tension on the seal body's distal section and creating an interference fit between collector 276 and distal section 119 as well as distal section 119 and cover 150. The purpose of creating the interference fit is to prevent the escape of electrolyte along the interface of collector 276 and hub 114. Since distal section 119 must be uniformly compressed between collector 276 and inner cover 150, the pressure relief indentations located in the hub's venting section 117 cannot extend into the distal section. A second opening 156 in cover 150 allows gases that vent through a rupture in the seal to escape from the space defined by the top surface 102 of the seal body and cover 150. An opening 160 in terminal cover 158 allows gases that have passed through opening 156 to move beyond the terminal cover into the cell's external environment. Terminal cover 158, positioned above closure assembly 270, makes electrical contact with current collector 276.

First electrode 250, also known herein as a cathode, contacts the inside surface of container 210 and defines a centrally located cavity. First electrode 250 is a mixture of manganese dioxide, graphite and an aqueous solution containing potassium hydroxide. The electrode is formed by disposing a quantity of the mixture into the open ended container and then using a ram to mold the mixture into a solid tubular shape that defines a cavity which is concentric with the sidewall of the container. First electrode 250 has a ledge 252 and an interior surface 256. As an alternative to molding the cathode in the container, the cathode may be formed by preforming a plurality of rings from the mixture comprising manganese dioxide and then inserting the rings into the container to form the tubularly shaped first electrode.

Second electrode 260 is a homogenous mixture of an aqueous alkaline electrolyte, zinc powder, and a gelling agent such as crosslinked polyacrylic acid. The aqueous alkaline electrolyte comprises an alkaline metal hydroxide such as potassium hydroxide, sodium hydroxide, or mixtures thereof. Potassium hydroxide is preferred. The gelling agent suitable for use in a cell of this invention can be a crosslinked polyacrylic acid, such as Carbopol 940®, which is available from B. F. Goodrich, Performance Materials Division, Cleveland, Ohio, USA. Carboxymethyylcellulose, polyacrylamide and sodium polyacrylate are examples of other gelling agents that are suitable for use in an alkaline electrolyte solution. The zinc powder may be pure zinc or an alloy comprising an appropriate amount of one or more of the metals selected from the group consisting of indium, lead, bismuth, lithium, calcium and aluminum. A suitable anode mixture contains 67 weight percent zinc powder, 0.50 weight percent gelling agent and 32.5 weight percent alkaline electrolyte having 40 weight percent potassium hydroxide. The quantity of zinc can range from 63 percent by weight to 70 percent by weight of the anode. Other components such as gassing inhibitors, organic or inorganic anticorrosive agents, binders or surfactants may be optionally added to the ingredients listed above. Examples of gassing inhibitors or anticorrosive agents can include indium salts (such as indium hydroxide), perfluoroalkyl ammonium salts, alkali metal sulfides, etc. Examples of surfactants can include polyethylene oxide, polyethylene alkylethers, perfluoroalkyl compounds, and the like. The second electrode may be manufactured by combining the ingredients described above into a ribbon blender or drum mixer and then working the mixture into a wet slurry.

Electrolyte suitable for use in a cell of this invention is a thirty-seven percent by weight aqueous solution of potassium hydroxide. The electrolyte may be incorporated into the cell by disposing a quantity of the fluid electrolyte into the cavity defined by the first electrode. The electrolyte may also be introduced into the cell by allowing the gelling medium to absorb an aqueous solution of potassium hydroxide during the process used to manufacture the second electrode. The method used to incorporate electrolyte into the cell is not critical provided the electrolyte is in contact with the first electrode 250, second electrode 260 and separator 220.

Separator 220 is a coiled film of nonwoven fibers. The separator is disposed about the interior surface 256 of first electrode 250. One of the separator's functions is to provide a barrier at the interface of the first and second electrodes. The barrier must be electrically insulating and ionically permeable.

The above description is considered that of the preferred embodiments only. Modifications of the invention will occur to those skilled in the art and to those who make or use the invention. Therefore, it is understood that the embodiments shown in the drawings and described above are merely for illustrative purposes and are not intended to limit the scope of the invention, which is defined by the following claims as interpreted according to the principles of patent law, including the Doctrine of Equivalents.

What is claimed is:

1. An electrochemical cell, comprising:
    (a) a container having an open end, a closed end and a sidewall therebetween, said container comprising a separator and electrochemically active materials arranged on opposite sides of said separator;
    (b) a disc shaped seal body secured to the open end of said container, said seal body formed as a single component and having a top surface, a bottom surface and a perimeter contacting said top and bottom surfaces, a flexible diaphragm formed between said surfaces and positioned around a centrally located protrusion projecting perpendicularly from the center of said top surface and defining an opening between said top and bottom surfaces, said protrusion having a proximal section, a venting section and a distal section, said proximal section abutting said flexible diaphragm at a ventable interface and comprising an outer surface free of one or more indentations, said venting section concentrically aligned with and abutting said proximal section and comprising an outer surface with at least one indentation formed therein, said venting section's indentation creating an unobstructed pressure relief path along the outer surface of said venting section, said distal section concentrically aligned with and abutting said venting section;
    (c) a current collector extending through said opening in said protrusion and adapted to contact an electrochemically active material in said cell; and
    (d) an outer cover positioned between said seal body's flexible diaphragm and the cell's external environment.

2. The electrochemical cell of claim 1 further comprising an inner cover located between said flexible diaphragm and said outer cover, said inner cover comprising a centrally located hole with an inside diameter at least as large as the outside diameter of said protrusion's distal section, said seal body's distal section projecting through said inner cover's centrally located hole.

3. The electrochemical cell of claim 2, wherein said inner cover and said current collector cooperate to compress a portion of said distal section, said current collector's outside diameter selected to exceed the inside diameter of said seal body's opening prior to insertion of said collector, said collector thereby imparting tangential tension on the compressed portion of said distal section.

4. The electrochemical cell of claim 1 wherein the outside diameter of said distal section is smaller than the outside diameter of said venting section and the outside diameter of said venting section is smaller than the outside diameter of said proximal section.

5. The electrochemical cell of claim 4 wherein a shoulder is formed on said protrusion at the interface of said venting section and said distal section.

6. The electrochemical cell of claim 1 wherein said ventable interface forms at least 180° arc.

7. The electrochemical cell of claim 1 wherein said ventable interface forms at least a 270° arc.

8. The electrochemical cell of claim 1 wherein said ventable interface forms a circle.

9. The electrochemical cell of claim 1 wherein said venting section's indentation has at least a width to depth ratio greater than 1:1 and less than 6:1.

10. The electrochemical cell of claim 1 wherein said venting section's indentation has a width to depth ratio greater than 2:1 and less than 4:1.

11. The electrochemical cell of claim 1 wherein said venting section's indentation is arcuate shaped.

12. The electrochemical cell of claim 1 wherein said venting section's outer surface comprises at least two indentations.

13. The electrochemical cell of claim 12 wherein said seal body comprises at least one rib formed in said flexible diaphragm, said rib abutting said protrusion's proximal section and aligned with a line radiating from the center of said seal body toward the perimeter of said seal body, said rib located between said at least two indentations in said venting section.

14. The electrochemical cell of claim 1 wherein said venting section's outer surface comprises at least four indentations.

15. The electrochemical cell of claim 1 wherein said venting section's outer surface comprises at least six indentations.

16. The electrochemical cell of claim 1 wherein said cover is electrically conductive and contacts said current collector.

17. The electrochemical cell of claim 1 wherein said seal body is electrically nonconductive.

18. The electrochemical cell of claim 17 wherein said seal body comprises a material selected from the group consisting of nylon, polypropylene and polystyrene.

19. The electrochemical cell of claim 17 wherein said seal body consists of a material selected from the group consisting of nylon, polypropylene and polystyrene.

20. A disc shaped seal body formed as a single component for use in a pressurized container, comprises:
  (a) a first surface, a second surface and a flexible diaphragm formed between said surfaces; and
  (b) a centrally located protrusion projecting perpendicularly from the center of said first surface, said diaphragm positioned around said protrusion, said protrusion having a proximal section and a venting section, said proximal section abutting said flexible diaphragm at a ventable interface and comprising an outer surface free of one or more indentations, said ventable interface forms an arc of at least 180°, said venting section concentrically aligned with and abutting said proximal section and comprising an outer surface with at least one indentation formed therein, said venting section's indentation creating an unobstructed path along the outer surface of said venting section.

21. The seal body of claim 20 wherein said ventable interface forms an arc of at least 270°.

22. The seal body of claim 20 wherein said venting section's outer surface comprises two or more indentations.

23. The seal body of claim 20 wherein said venting section's outer surface comprises four or more indentations.

24. The seal body of claim 20 wherein said venting section's outer surface comprises six or more indentations.

25. The seal body of claim 20 wherein said venting section's indentation has at least a 1:1 ratio of width to depth.

26. The seal body of claim 20 wherein said venting section's indentation has at least a 2:1 ratio of width to depth.

27. The seal body of claim 20 wherein said venting section's indentation is arcuate shaped.

28. The electrochemical cell of claim 20 wherein said seal body is electrically nonconductive.

29. The electrochemical cell of claim 20 wherein said seal body comprises a material selected from the group consisting of nylon, polypropylene and polystyrene.

30. The electrochemical cell of claim 20 wherein said seal body consists of a material selected from the group consisting of nylon, polypropylene and polystyrene.

* * * * *